United States Patent
Willmann

(10) Patent No.: US 10,751,796 B2
(45) Date of Patent: Aug. 25, 2020

(54) THREE-DIMENSIONAL PRINTING DEVICE USING INDUCTIVE AND RESISTIVE DEVICES

(71) Applicant: EDER NUMERO 1, Ambon (FR)

(72) Inventor: Etienne Willmann, Lauzach (FR)

(73) Assignee: EDER NUMERO 1, Ambon (FR)

(*) Notice: Subject to any disclaimer, the term of this patent is extended or adjusted under 35 U.S.C. 154(b) by 177 days.

(21) Appl. No.: 15/565,323

(22) PCT Filed: Apr. 7, 2016

(86) PCT No.: PCT/FR2016/050793
§ 371 (c)(1),
(2) Date: Oct. 9, 2017

(87) PCT Pub. No.: WO2016/162637
PCT Pub. Date: Oct. 13, 2016

(65) Prior Publication Data
US 2018/0311727 A1    Nov. 1, 2018

(30) Foreign Application Priority Data

Apr. 7, 2015   (FR) ..................................... 15 00715
Aug. 21, 2015  (FR) ..................................... 15 57850

(51) Int. Cl.
*B33Y 30/00* (2015.01)
*B22F 3/00* (2006.01)
(Continued)

(52) U.S. Cl.
CPC ............ *B22F 3/008* (2013.01); *B22F 3/1055* (2013.01); *B22F 7/064* (2013.01);
(Continued)

(58) Field of Classification Search
CPC .............................. B33Y 10/00; B33Y 30/00
See application file for complete search history.

(56) References Cited

U.S. PATENT DOCUMENTS

2014/0061165 A1*  3/2014  Stempfer .............. B22F 3/1055
                                                                219/73.21

FOREIGN PATENT DOCUMENTS

CN           103862046 A      6/2014

OTHER PUBLICATIONS

International Search Report for PCT Patent App. No. PCT/FR2016/050793 (dated Jul. 28, 2016) with English language translation thereof.

(Continued)

*Primary Examiner* — Scott R Kastler
(74) *Attorney, Agent, or Firm* — Kenealy Vaidya LLP

(57) ABSTRACT

Some embodiments are directed to a device for the three-dimensional printing of a component that is to be produced, the component to be produced including a receiving surface, the device comprising: a print head that includes: a supplier for supplying a ferromagnetic print material, the supplier including an outlet; and a device for allowing the melting of the print material prior to laying; a first inert-gas spray nozzle disposed at the level of the outlet of the supplier; and a second inert-gas spray nozzle disposed at the level of a point of contact of the molten print material with the receiving surface of the component that is to be produced in the process of being produced so as to allow gas to be supplied at a desired pressure.

23 Claims, 3 Drawing Sheets

(51) Int. Cl.
    *B33Y 10/00*     (2015.01)
    *H05B 6/14*     (2006.01)
    *B22F 3/105*     (2006.01)
    *B23K 35/02*     (2006.01)
    *B22F 7/06*     (2006.01)
    *B29C 64/20*     (2017.01)
    *B29C 64/106*     (2017.01)
    *B33Y 40/00*     (2020.01)
    *B29C 64/295*     (2017.01)
    *B29C 64/371*     (2017.01)

(52) U.S. Cl.
    CPC ........ *B23K 35/0261* (2013.01); *B29C 64/106* (2017.08); *B29C 64/20* (2017.08); *B29C 64/295* (2017.08); *B29C 64/371* (2017.08); *B33Y 10/00* (2014.12); *B33Y 30/00* (2014.12); *B33Y 40/00* (2014.12); *H05B 6/14* (2013.01); *B22F 2003/1056* (2013.01); *B22F 2003/1057* (2013.01); *B22F 2999/00* (2013.01); *Y02P 10/295* (2015.11)

(56) References Cited

OTHER PUBLICATIONS

Written Opinion for PCT Patent App. No. PCT/FR2016/050793 (dated Jul. 28, 2016).
Search Report from French Patent App. No. 1557850 (dated Jul. 15, 2016).

\* cited by examiner

THREE-DIMENSIONAL PRINTING DEVICE USING INDUCTIVE AND RESISTIVE DEVICES

CROSS REFERENCE TO RELATED APPLICATIONS

This application is a national phase filing under 35 C.F.R. § 371 of and claims priority to PCT Patent Application No. PCT/FR2016/050793, filed on Apr. 7, 2016, which claims the priority benefit under 35 U.S.C. § 119 of French Patent Application No. 1557850, filed on Aug. 21, 2015, and French Patent Application No. 1500715, filed on Apr. 7, 2015, the contents of each of which are hereby incorporated in their entireties by reference.

BACKGROUND

Some embodiments are related to a device for the three-dimensional printing of a component from a print material or set of print materials.

In the framework of using ferromagnetic print materials, melting temperatures are increased, from several hundreds of degrees to several thousands of degrees. Because of their composition, ferromagnetic materials, at the time of the implementation during a melting process, are sensitive to any oxidation which thus leads to a degradation of the component thus produced, by a degradation of the weld between the melted or molten filament and a surface for laying the component being produced. It is known to produce the deposit of a melted or molten filament of print material in a controlled atmosphere enclosure. However, such an enclosure is not perfectly sealed and therefore does not allow to ensure the sole presence of an inert-gas near the melted or molten filament of ferromagnetic print material.

An aim of some embodiments is to supply a device for the three-dimensional printing of a component to be produced by a method of depositing melted or molten filament of ferromagnetic print material which allows an optimal weld to be obtained between the melted or molten filament and the deposit surface receiving this filament of the component being produced.

To this end, a device for the three-dimensional printing of a component to be produced is provided according to some embodiments, including a print head including:
  a supplier for supplying a ferromagnetic print material;
  a device for allowing the melting of the print material prior to laying;
  a first inert-gas spray nozzle at the level of an outlet of the supplier;
  a second inert-gas spray nozzle at the level of a point of contact of the molten print material with a receiving surface of the component that is to be produced in the process of being produced so as to allow gas to be supplied at a desired pressure.

Advantageously, but optionally, the printing device according to some embodiments includes at least one of the following additional technical characteristics:
  the device for allowing melting includes a first heater that heats the print material by induction;
  the first heater is arranged so as to allow a heating of a deposit surface of the molten print material of the component being produced;
  the device for allowing melting includes a second heater that heats by induction of a deposit surface of the molten print material of the component being produced;
  the first and/or second heaters surround an outlet of the print material supplier;
  the first and/or second heaters only extend in front of an outlet of the print material supplier and has a U-shape at 90° from a direction of travel of the print head in use;
  the first and/or second heaters have a horseshoe shape, being positioned in front of and in the part around an outlet of the print material supplier;
  the first and/or second heaters are positioned in front of and/or behind and/or on the sides of the print material supplier;
  the first and/or second heaters are arranged so as to allow a deposit of the print material under any angle of incidence;
  the device for allowing melting includes a current supplier, of which a terminal is connected to the print material and another terminal is connected to the component being produced;
  the print material supplier includes one or several print material supply ducts;
  the device includes two or more print heads;
  the print material is in the form of a powder;
  the print material supplier includes a powder projection nozzle;
  the powder forming the print material is propelled by an inert-gas;
  the print material is in the form of a wire;
  the print material is a ferromagnetic and/or magnetodielectric material;
  the print head includes a supplier for supplying a reinforcement material in the form of a wire or a ribbon arranged so as to lay the reinforcement material on a deposit surface of the molten print material of the component being produced, before a deposit point of the molten print material of the deposit surface;
  the first inert-gas spray nozzle is arranged so as to be adjustable, in particular in order to be able to orient an inert-gas flow in a direction of travel of the print head;
  the material supplier and/or the supplier for supplying a reinforcement material includes a device for putting in-use materials under inert-gas;
  the device includes inert-gas spray adjustment supplier for;
  the device includes a cooler for cooling all or most of the print head;
  the device for allowing the melting of the print material, the first inert-gas spray nozzle and the second inert-gas spray nozzle are assembled so that they can be moved in relation to the print material supplier; and,
  the device includes one or several inductors connected to one or several induction devices positioned either in front of, behind, or on the sides of the print head.

A use of a device having at least one of the preceding technical characteristics is also provided according to some embodiments, to assemble two or more existing components by a deposit of print material at a connection between the two or more components.

BRIEF DESCRIPTION OF THE FIGURES

Other characteristics and advantages of some embodiments will appear during the description below of embodiments. In the appended drawings.

DETAILED DESCRIPTION OF THE EMBODIMENTS

Figure 1:
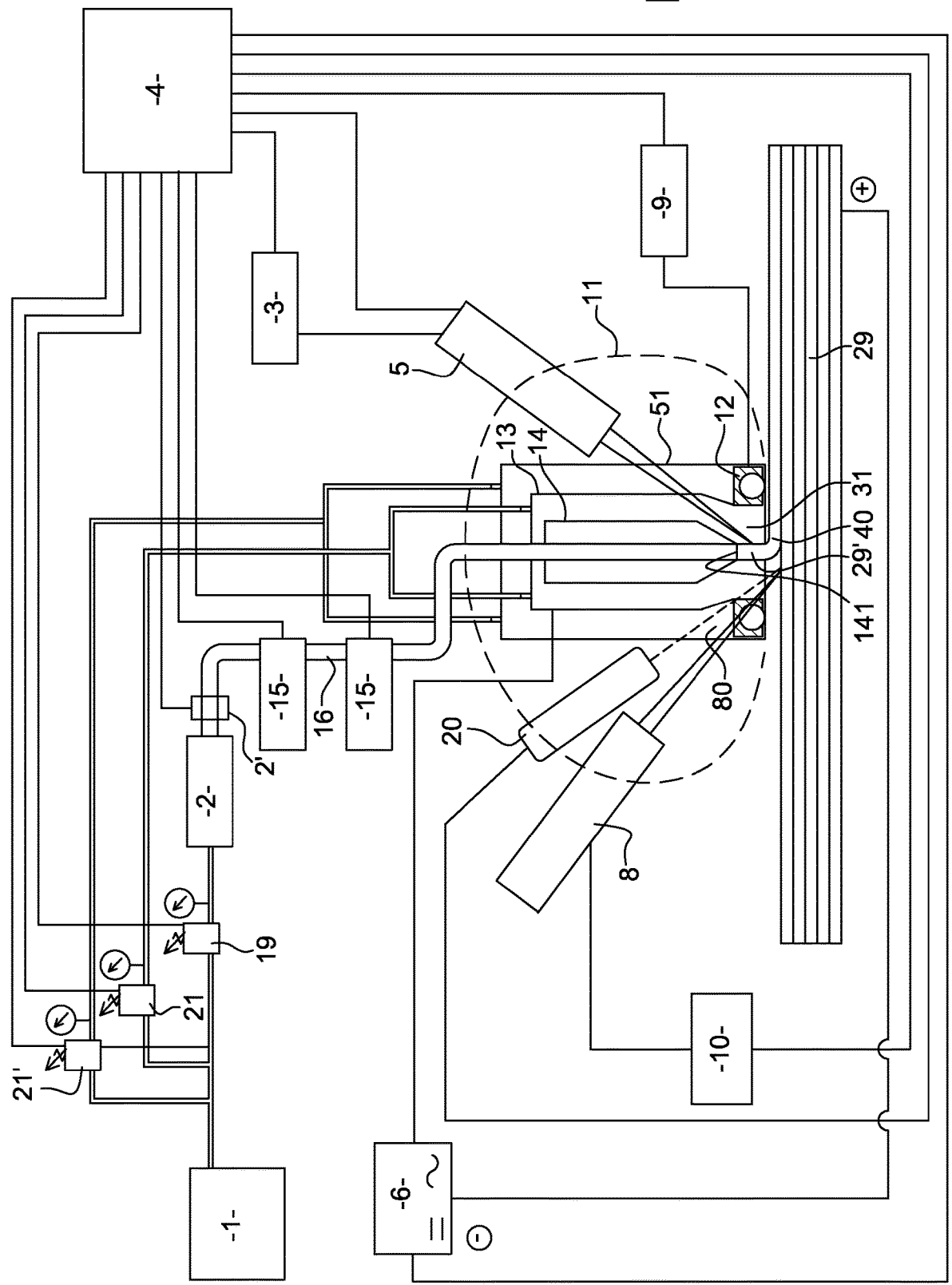
FIG. 1 is a schematic view of a printing device according to some embodiments using a print material in the form of a wire.

In reference to FIG. 1, a first embodiment of a three-dimensional printing device according to some embodiments using a print material in wire form, the principle of supplying a wire, will be defined. The three-dimensional printing device according to some embodiments includes:

control and drive device 4, here, in the form of an electronic control and driving card.

device for storing 1 inert-gas which will allow a controlled atmosphere of inert-gas to be generated at the level of the deposit of the molten material 29' on a component 29 being produced.

one (or several) winder(s) 2 wherein the print material(s) are stored in wire form, which will then be unwound up to one or several print heads 11 of the three-dimensional printing device according to some embodiments. Coming out of the winder 2, controllers for controlling the presence of wire 2' are positioned and connected to the control and drive device 4, to which it informs of the presence of a wire in the winder 2. Furthermore, the winder is connected to the device for storing 1 inert-gas via a first trigger station 19. This allows, from the start, to put the print material in wire form in a controlled atmosphere of inert-gas.

one or several motors 15 allowing the precise supply of one or several print materials in wire form, from the winder 2 to the print head 11. The motors 15 are connected to be driven by the control and drive device 4. The motors 15 allow the movement of the print material in wire form within a supply duct or tube 16. In a variant of the embodiment, it is possible to provide one or several wire presence control devices, similar to the wire presence control device 2', at several places in the supply duct 16 up to the print head 11 according to the technical choices made for the printing of a component 29 by the three-dimensional printing device according to some embodiments.

a print head 11.

The print head 11 includes a first inert-gas spray nozzle 13. It further includes a wire descent tube 14 and an inductor 12. The wire descent tube 14 is directly connected to the supply duct 16 of the print material in wire form. The wire descent tube 14 forms, with the supply duct 16, the motors 15 and the winder 2, the supplier for supplying the three-dimensional printing device according to some embodiments. The wire descent tube 14 includes an open end 141 forming an outlet of the print material in wire form from the supplier. The first inert-gas spray nozzle 13 here covers the wire descent tube 14 and includes an ejection outlet 31 which ejects the inert-gas to the level of the outlet 141 of the supplier of the three-dimensional printing device according to some embodiments. The first inert-gas spray nozzle 13 can, in a variant of the embodiment, include a cooling system. The first inert-gas spray nozzle 13 is smoothly connected to the device for storing inert-gas 2 via a second trigger station 21. Thus, the first inert-gas spray nozzle 13 allows a spray of inert-gas towards a melting zone 29' of the print material in wire form. The first inert-gas spray nozzle 13 allows the atmospheric environment to be controlled, thus controlled, from the melting zone 29'. The presence of inert-gas in this environment allows to avoid a modification or the degradation of the molten print material, by oxidation, for example.

Moreover, the wire descent tube 14 is possible cooled, if needed, by a cooling system (not represented) like a water system or any other heat transfer fluid.

The inductor 12 is assembled, here, sealed on an external periphery of the ejection outlet 31 of the first inert-gas spray nozzle 13. The inductor 12 is thus located slightly under the outlet 141 of the wire descent tube 14. The inductor 12 can include (or not) magnetodielectric materials allowing to control a form of magnetic flow generated, as well as driving the concentration of the magnetic flow that it generates while functioning in the desired place. The inductor 12 can have different forms. A first form surrounds the wire descent tube 14 at the level of the ejection outlet of the first inert-gas spray nozzle 13. A second possible form allows the inductor 12 to only extend in front of the outlet 141 of the wire descent tube 14 at the time of the print head 11 of the three-dimensional printing device according to some embodiments moving in the direction in relation to the component being produced 29, the inductor 12 being able to have a U-shape positioned at 90° in relation to a direction of travel of the print head 11. A third possible form is a horseshoe shape being positioned in front of and, in part, around the outlet 141 of the descent tube 14. Other solutions of form are possible. The inductor 12 can be positioned in front of and/or behind the wire deposit. The inductor 12 is controlled by an induction device 9 to which it is connected. The induction device is itself driven by the control and drive device, to which it is connected. It is also possible, according to the technical choices made, to position one or several inductors 12 and one or several induction devices 9 either in front of, behind, or on the sides of the print head 11 of the three-dimensional printing device according to some embodiments, this solution allowing, according to the prints made, to make the desired temperatures vary on the melting zone 29' of the print material in wire form and on the component being produced 29.

On the other hand, in order to protect the component being produced 29 during it being heated up by the inductor 12, and therefore it being put into a controlled atmosphere including an inert-gas, it is possible to create a new inert-gas system, similar to that of the first gas spray nozzle 13, the first gas spray nozzle 13 as well as the inductor 12 therefore being located inside the new inert-gas system. To this end, the print head 11 of the three-dimensional printing device according to some embodiments includes a second inert-gas spray nozzle 51 including an inert-gas ejection outlet 80 which allows an ejection of inert-gas prior to it being heated up by the inductor 12. The second inert-gas spray nozzle 51 is smoothly connected to the inert-gas storage device 1 via a third trigger station 21'. The inert-gas is then projected around and on the deposit zone 40 of the component being produced 29. Thus, the second inert-gas spray nozzle 51 supplies a gas spray circuit around the external part of the inductor 12, allowing an inert-gas controlled atmosphere to be had around the print head 11 of the three-dimensional printing device according to some embodiments. The second inert-gas spray nozzle 51 can, in a variant of the embodiment, include a cooling system.

Furthermore, the three-dimensional printing device according to some embodiments includes a current generator 6 which allows to supply a direct current with a low or high amperage. It is connected to the wire descent tube 14 and controlled by the control and drive device 4 in order to control the voltage and the amperage requested. If need be, the current generator 6 can also supply an alternating current. The current generator 6 is connected from one of its terminals to the wire descent tube 14 by a first dedicated cable and from the other of its terminals to the component being produced 29 by a second dedicated cable. Thus, the current generated by the current generator 6 crosses the print material in wire form in order to put the molten print material in wire form at least at the level of the melting zone 29', this melting zone instantly solidifying at the point of the deposit zone 40 of the component being produced 29: the wire descent tube 14 is supplied with current by the current generator 6 and transfers this current into the print material in wire form in order to achieve its final increase in temperature towards a melting temperature at the point of contact with the component 29 of the print material in wire form used. This is possible if the print material is a material that at least conducts electric current.

In order to be able to have optimal control of the deposit of melted or molten filament of the melting zone 29' on the deposit zone 40 of the component being produced 29, the three-dimensional printing device according to some embodiments includes heat measuring devices. A first heat sensor 5 allows, if needed, to measure a temperature of the print material at the level of the outlet 141 of the wire descent tube 14. The sensor 5 can also be used alternatively to measure a temperature of the deposit following the passage of the melted and molten wire to the component 29. A second heat sensor 8 allows a measurement of a temperature of the component being produced 29 just in front of the deposit zone 40 in the direction of travel of the print head 11. These two heat measurements thus taken by the two heat sensors 5 and 8 allow the control of the temperature generated by the inductor 12 (and its induction device 9) and the current generator 6 via the control and drive device 4. For this, each one of the heat sensors is connected to the control and drive device 4. Furthermore, each one of the heat sensors 5, 8 includes a dedicated supply 3, 10.

Moreover, a measurement of distance from the print head 11 with the deposit zone 40 of the component being produced 29 is taken by a measuring device 20 as close as possible to a laying point of the deposit zone 40 of the molten print material, this measuring device 20 is connected to the control and drive device 4. This allows to control the distance, if needed, between the print head 11 and the component being produced 29.

All or most of the elements of the print head 11 and 110 defined above have the possibility of being assembled in a way specific to them, a rotating solution, as a unit or separately, in order to optimize the manufacturing of the component being produced.

Using the three-dimensional printing device according to some embodiments which has just been defined, there is a predetermined temperature being set for the deposit zone 40 of the component being produced 29 by the inductor 12. This inductor heats up the component being produced 29 to the temperature allowing the supply of the wire and the melting between the two at the level of the deposit zone 40. The inductor 12 also allows to heat up the print material in wire form at the level of the melting zone 29'. This heating up is completed by a resistive heating, by the transfer of current supplied by the current generator 6 of the descent tube 14 towards the component being produced 29 during contact with it of the molten print material. The different temperatures thus obtained allow a control of the position of the melting zone 29' with the deposit zone 40 of the component being produced 29. The adjustment of different heating systems allows to guarantee an optimal and continuous form of the deposit of print material. In particular, following the deposit of the molten print material in wire form, the material deposited freezes. In the embodiment illustrated in FIG. 1, the inductor 12, in its part located behind the deposit in relation to the direction of travel of the print head 11, slows down the fall in temperature gradients of the material deposited on the component being produced after the deposit zone 40 according to the direction of travel of the print head. The inductor 12, at this level, can allow another temporary melting of the layer of print material thus deposited in order to optimize its cohesion and/or a cooling speed of the layer deposited. In a variant, the inductor 12 is only located in front: it thus preheats the material by induction and generate the melting at the time of the supply of wire by supporting the supply of heat coming from the current generator 6.

Generally, the print head 11 of the three-dimensional printing device according to some embodiments is used in order to deposit the molten print material vertically or at an angle given in relation to a path and to the direction of travel of print head 11 on the component being produced. In the case illustrated in FIG. 1, this position is at 90° but could vary up to 45° over all or most desired angles and axes according to the supply technique and the direction of travel of the print head 11. This possibility involves being able to modify the form and arrangement of the print head 11 and therefore to modify the positioning of the wire descent tube 14, the inductor 12, the different inert-gas spray nozzles 13 and 51, the heat sensors 5 and 8 and the measuring device 20. In particular, the inductor 12 can be put either in front of, or behind the molten wire deposit on the deposit zone 40. Moreover, the inert-gas projected by the inert-gas spray nozzle 13 can be oriented at the level of the ejection outlet 31 to obtain a projection direction of the inert-gas in a direction of travel of the print head 11, involving a rotation of the inert-gas flow projected at the level of ejection outlet 31 by the inert-gas spray nozzle 13. For this, the first inert-gas spray nozzle 13 is adjustable. The three-dimensional printing device according to some embodiments can be compounded in order to deposit several print materials in wire form at the same time, with one or several inductive systems 9, 12 according to the choices retained. The three-dimensional printing device according to some embodiments also allows assemblies of different materials and different mechanical technical characteristics, either by using one with this print head, or with a print head connecting several wires. If there are several print material wires, there will be several supply and control systems.

In this embodiment of the three-dimensional printing device according to some embodiments, the set of elements that are connected to the print head 11, namely the first 13 and second 51 inert-gas spray nozzles, the wire descent tube 14, the motors 15 and the winder 2 are under controlled atmosphere with a pressure controlled by the trigger stations 19, 21 and 21'.

It must or should be noted that in a variant of the embodiment, an environment of producing a component 29 can be found in a closed enclosure (not represented) filled with inert-gas of which the specificity differs according to the print material chosen. Insofar as this closed enclosure is filled with inert-gas and can be coupled with an integrated gas recycling system in order to have an atmosphere of optimal purity of inert-gas on the melting zone 29' and of its close environment as well as on the deposit zone 40 of the molten print material on the component being produced 29.

Figure 2:
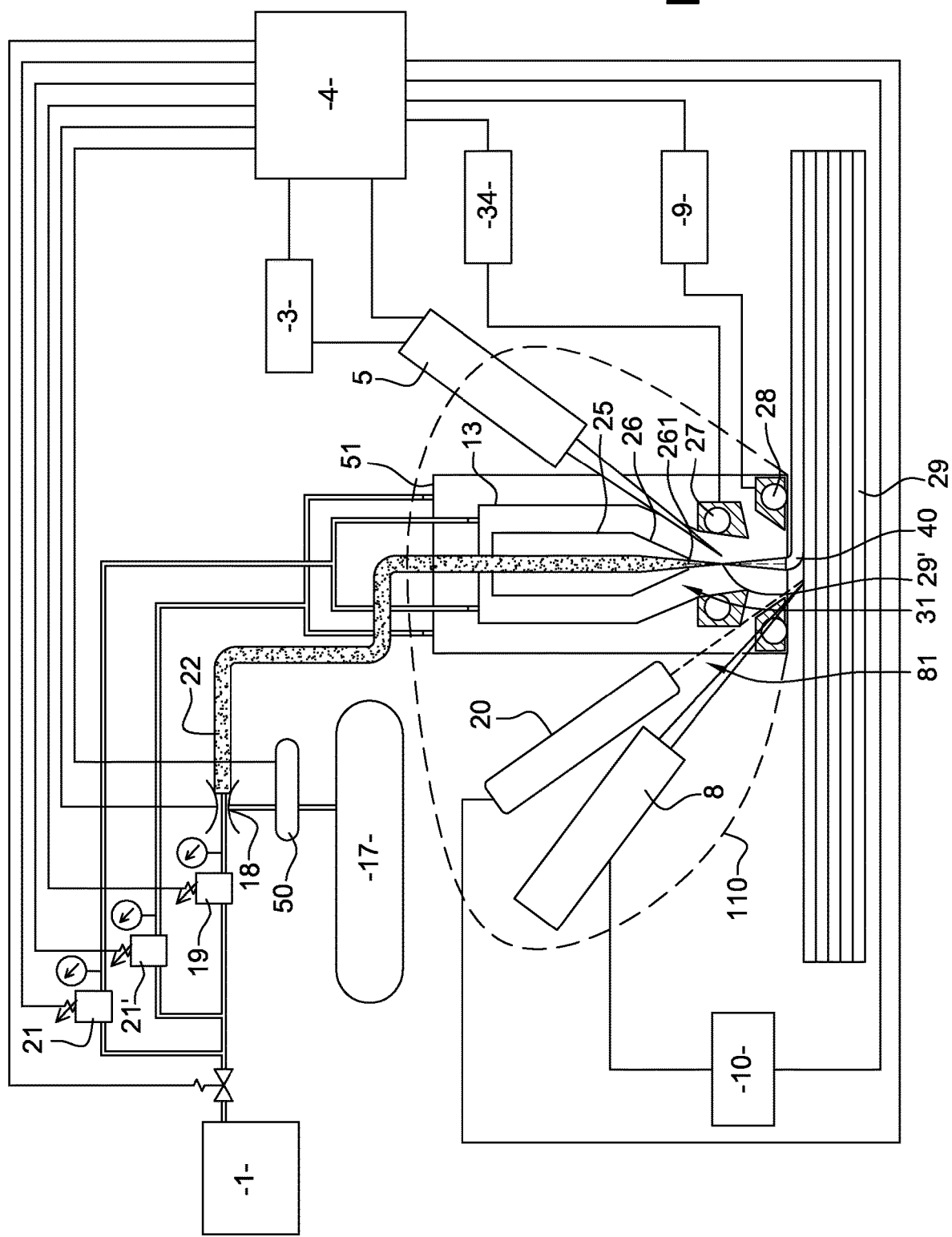
FIG. 2 is a schematic view of a printing device according to some embodiments using a print material in the form of a powder.

In reference to FIG. 2, a second embodiment of a three-dimensional printing device according to some embodiments will now be defined, here using a print material in powder form. The common elements of this embodiment with the preceding embodiment have the same references and will not be defined again in the details below. The three-dimensional printing device according to the principle of supplying powder in FIG. 2 includes:

control and drive device 4;

a device for storing 1 inert-gas allowing to generate a controlled atmosphere of inert-gas at the level of the deposit of the molten material 29' on a component 29 being produced;

a device for sucking 18 the print material in powder form, for example, a Venturi system, connected via the trigger station 19 to the inert-gas storage supplier for 1.

a powder container 17 including print material in powder form, the powder container 17 being connected to the suction device 18 in order to allow a mixture of inert-gas and print material in powder form, the inert-gas thus serving as a propellant of the print material in powder form in a supply duct 22. This further allows, from the start, to put the print material in wire form in a controlled atmosphere of inert-gas. The powder container 17 has, at its outlet between the powder container 17 and the suction device 18, a system for measuring a quantity of powder 50 remaining in the powder container 17. The measuring system 50 is fitted with a cut-off valve allowing the printing to stop and isolating the powder container 17 from the suction device 18. For this, the measuring system 50 is connected to the control and drive device 4.

A print head 110.

The print head 110 is very similar in its structure to the print head 11 previously defined in relation to the first embodiment of the three-dimensional printing device according to some embodiments. Thus, the print head 110 includes the first inert-gas spray nozzle 13. It further includes a powder descent tube 25 and an inductor 27. The powder descent tube 25 is directly connected to the supply duct 22 of the print material in powder form. The powder descent tube 25 forms, with the supply duct 22, the suction device 18 and the powder container 17, the supplier for supplying the three-dimensional printing device according to some embodiments. The powder descent tube 25 includes, at a bottom open end in FIG. 2, a projection nozzle 26 forming an outlet of the print material in powder form of the supplier. The first inert-gas spray nozzle 13 here covers the powder descent tube 24 and the projection nozzle 26 and includes the ejection outlet 31 which eject inert-gas at the level of an outlet 261 of the projection nozzle 26 of the supplier of the three-dimensional printing device according to some embodiments. The first inert-gas spray nozzle 13 can, in a variant of the embodiment, include a cooling system. The first inert-gas spray nozzle 13 is smoothly connected to the inert-gas storage device 2 via the second trigger station 21. Thus, the first inert-gas spray nozzle 13 allows inert-gas to be sprayed towards the melting zone 29' of the print material in powder form. The first inert-gas spray nozzle 13 allows the atmospheric environment to be controlled, thus controlled, from the melting zone 29' and from the deposit zone 40. The presence of inert-gas in this environment allows to avoid a modification or the degradation of the molten print material, by oxidation, for example. Moreover, the powder descent tube 25 and possibly the projection nozzle 26 are possibly cooled, if needed, by a cooling system (not represented) like a water system or any other heat transfer fluid.

In a variant, the projection nozzle 26 can have a variable geometry according to the desired deposit form and the distance with the deposit zone 40 of the component being produced 29. In an additional variant, the projection nozzle 26 can have a variable robotic geometry in order to make the chosen projection form vary as well as control the distance with the deposit zone 40 of the component being produced 29. The projection nozzle 26 is preferably centred with the inductor 27 that will now be defined.

The inductor 27 is assembled, here, sealed on an external periphery of the ejection outlet 31 of the first inert-gas spray nozzle 13. The inductor 27 is thus located slightly under the outlet 261 of the projection nozzle 26 of the powder descent tube 25. The inductor 27 can include (or not) magnetodielectric materials allowing to control a form of the magnetic flow generated as well as driving the concentration of the magnetic flow that it generates while functioning at the desired place.

The inductor 27 can have different forms like the inductor 12 previously defined in the case of the print head 11 of the first embodiment of the three-dimensional printing device according to some embodiments. The inductor 27 is controlled by an induction device 34 to which it is connected. The induction device 34 is itself driven by the control and drive device 4 to which it is connected.

The print head 110 of the three-dimensional printing device according to some embodiments includes the second inert-gas spray nozzle 51 including an inert-gas ejection outlet 81 which allows an ejection of inert-gas prior to being heated up by the inductor 27. The second inert-gas spray nozzle 51 is put into fluidic connexion with the inert-gas storage device 1 via a third trigger station 21'. The inert-gas is then projected around and on the deposit zone 40 of the component being produced 29. Thus, the second inert-gas spray nozzle 51 supplies a gas spray circuit around the external part of the inductor 27, allowing to have a controlled atmosphere of inert-gas around the print head 110 of the three-dimensional printing device according to some embodiments. The second inert-gas spray nozzle 51 can, in a variant of the embodiment, include a cooling system. Here, in this embodiment of the three-dimensional printing device according to some embodiments, the second inert-gas spray nozzle 51 includes a second inductor 28. The form and the position of the second inductor 28 allows to pre-heat the deposit zone 40 before the deposit of melted print material and to control the cooling of this same deposit zone after the deposit of the melted print material, and this according to the direction of travel of the print head 110. The second inductor 28 can be positioned only in front, in order to achieve the pre-heating. Other solutions are possible: the second inductor 28 includes a first front part and a second rear part. The second inductor 28 is controlled by an induction device 9 to which it is connected. The induction device 9 is itself driven by the control and drive device 4 to which it is connected.

However, in this second embodiment of the three-dimensional printing device according to some embodiments, the forms of the inductors 27 and 28, as well as the first 13 and second 51 inert-gas spray nozzles, further allow to control the centring and the dispersion of the print material in powder form between the projection nozzle 26 and the component being produced 29. The projection nozzle 26 projects a flow of inert-gas and print material in powder form towards the deposit zone 40 of the component being produced 29. The first inert-gas spray nozzle 13 confines the inert-gas and the print material in powder form 30 towards the desired direction of the deposit zone 40 of the component being produced 29, in order to control the dispersion of the powder going towards the component being produced 29. In a variant, the inert-gas sprayed by the first inert-gas spray nozzle 13 orients the projection of powder towards an ideal point in the magnetic field of the inductor 27 to produce a melting 29' of the print material in powder form.

In order to preserve a linear and consistent flow of powder, the second supply of inert-gas by the second inert-gas spray nozzle 51 comes to contain the deformation of the powder flow due to the action of the inductor 27. In this configuration, the inductor 28 does not interfere with the print material in powder form at its print head 110 outlet and at the time of contact with the component being produced 29, as the print material is melted or molten 29'. The second inert has spray nozzle 51 disperses a supply of inert-gas under the inductor 27 and in the periphery of the printing zone. A distance from the powder descent tube 25 whereon the projection nozzle 26 is assembled at the second inductor 28 can vary according to the technical choices and characteristics of the print material in powder form used. The aim is to make the materials not undergo stresses, like the magnetic repulsion, at the time they come out of the descent device or projection device to produce their progression towards the component being produced, the stress coming from the magnetic field of the functioning inductive device.

The second embodiment of the three-dimensional printing device according to some embodiments allows to heat up the print material in powder form with the inductor 27 and to heat up the component being produced 29 with the inductor 28, the two temperatures obtained with the two inductors allow the melting of the supplied material 29' on the component being produced 29. Indeed, following the projection by the projection nozzle 26 and the first inert-gas spray nozzle 13 of a gas/powder and inert-gas mixture (outlet 31), the print material in powder form undergoes being heated up by the inductor 27 using (or not) a magnetodielectric material allowing the concentration of the magnetic flow to the desired place (29') making its molten point pass to the print material in powder form. In a second phase, the molten print material undergoes the effect of the inductor 28 using (or not) a magnetodielectric material allowing the concentration of the magnetic flow to the desired place, of which the working guideline allows it to heat up the component being produced 29 and secondarily (or not) the descending melted print material according to its distance with the inductor 28. During the contacting of the melted print material with the deposit zone 40 of the component being produced 29, the variation in temperature between the deposit zone 40 (below its melting point) and the melted print material (above its melting point) generates an optimal connection of the print material deposited on the component. As previously, several heat measurements are connected to the three-dimensional printing device according to some embodiments, allowing the process to be controlled: a first heat measurement 5 measures the temperature of the molten print material in powder form 30 following its passage in the inductor 27, a second temperature measurement 8 is taken on the component being produced 29 just before the contacting of a melted print material 29' with the component being produced 29.

In this embodiment of the three-dimensional printing device according to some embodiments, all or most of the elements that are connected to the print head 110, namely the first 13 and second 51 inert-gas spray nozzles, the powder descent tube 25, the supply duct 22 as well as the powder container 17, the suction device 18 and the system for measuring a quantity of powder 50, are under a controlled atmosphere with a pressure controlled by the trigger stations 19, 21 and 21'.

The second embodiment of the three-dimensional printing device according to some embodiments with two inductors 27 and 28 has just been defined. However, the number of inductors used as well as their positioning, their form and use (or not) of magnetodielectric materials is dependent on the technical choices made and can vary. Moreover, the second embodiment of the three-dimensional printing device according to some embodiments can have as many inductive devices, gas supplies, cooling systems, projection nozzles as the print head.

In the foregoing, the different inductors 12, 27, 28 can have one single coil or have multiple coils. In the case of an inductor 27 with multiple coils, the inert-gas supplies through the outlets 31 and 81 must or should allow, for example, to control the dispersion of the powder due to the magnetic field through the different coils if the inductor 27 and the connected materials generate closed cylinders between the coils. The control and drive device 4 controls the induction devices to supply their inductor connected to an alternating current of 1 Hz to 30 MHz.

On the other hand, the different inductors 12, 27, 28 have forms so as to obtain optimal inductive fields which generate a set of forces of the print material between the open end 141 of the wire descent tube 14, or the outlet 261 of the projection nozzle 26, according to the embodiment of the three-dimensional printing device according to some embodiments in question, and the deposit zone 40 on the component being produced 29. In the case of several inductors, their forms can be connected to each other so as to again improve the overall inductive field obtained. The magnetic fields thus obtained allow, via Lorentz forces, to keep the print material heated up in shape, as well as that already deposited on the deposit zone 40, thus allowing print material supplies which are not necessarily made vertically but also according to any angle of incidence, if needed.

Likewise, the wire descent tube and for the powder descent tube, as well as the powder projection nozzle are made of materials like copper or materials that have equivalent properties, as well as magnetodielectric materials.

Figure 3:
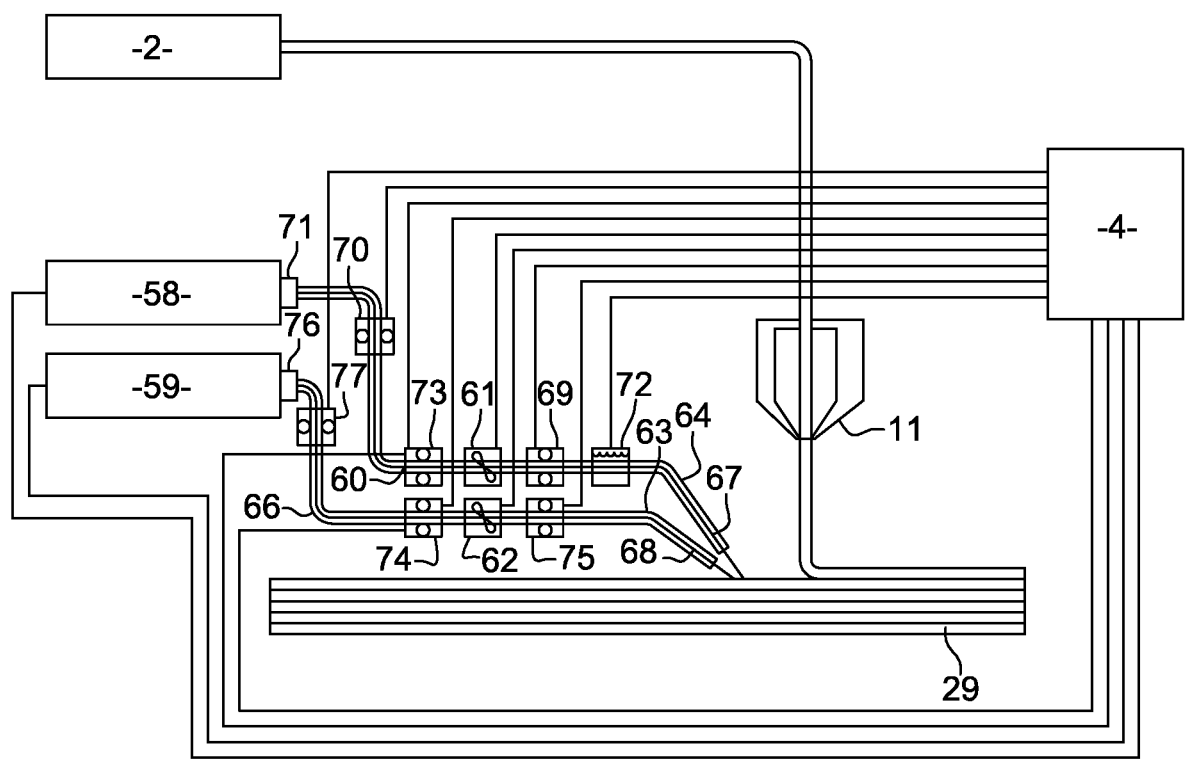
FIG. 3 is a schematic view of the printing device in FIG. 1 coupled with a system for supplying reinforcement material for producing a component in composite materials.

In reference to FIG. 3, a third embodiment of a three-dimensional printing device according to some embodiments will be defined. This third embodiment of the three-dimensional printing device according to some embodiments is based on the first and second embodiments of the three-dimensional printing device according to some embodiments. The third embodiment of the three-dimensional printing device according to some embodiments is the three-dimensional printing device according to some embodiments, according to the first or the second embodiment previously defined, to which is coupled a ferromagnetic (or not) wire or ribbon supply system, allowing a connection of materials that have different mechanical properties, in order to produce a component 29 from a composite material. A third embodiment of the three-dimensional printing device according to some embodiments will be defined, based on the first embodiment of the three-dimensional printing device according to some embodiments. The application to the second embodiment of the three-dimensional printing device according to some embodiments is made mutatis mutandis.

The wire or ribbon supply system 67 and 68 includes, here, two supply tubes 63 and 64 allowing the laying of two wires or ribbons 67 and 68 simultaneously. The supply tubes 63 and 64 have the possibility of being moved around the print head 11 separately, rotating or linearly according to the technical choices and to the number of print heads 11, this possibility allows to superimpose and/or cross the wires or ribbon 67 and 68 during the advancement of the print head 11. The number of wire or ribbon supply systems, as well as the number of rotating or linear axes vary according to the number of print heads 11 and the desired technical choices, therefore, as many wire or ribbon supply systems as desired can be had.

Each wire or ribbon supply device includes a winder 58, 59 containing the wire(s) or ribbon(s) stored to be dispersed. The winder 58, 59 can be put under a controlled atmosphere, by connecting it, for example, to the inert-gas storing device 2. At the outlet of the winder 58, 59, a device for controlling the presence of wire or ribbons 71, 76 is possibly installed, connected to the control and drive device 4. Following the device for controlling the presence of wire or ribbons 71, 76, a wire or ribbon drive motor 70, 77 is positioned.

The drive motor 70, 77 is coupled with a transportation tube 60, 66. The transportation tube 60, 66 is coupled with a wire or ribbon cutting system 61, 62. Before this wire or ribbon cutting system 61, 62, a second drive motor 73, 74 is positioned to allow the cutting and the advancement of the wire or ribbon 67, 68 to be controlled. Following the cutting device 61, 62, a third drive motor 69, 75 is positioned, allowing the cutting and the advancement of the wire or ribbon 67, 68, cut in a transportation tube 63, 64, to be controlled, if needed. Once the wire or ribbon 67,68 is passed in the transportation tube 63, 64, the wire or ribbon can be heated up via an inductive or resistive pre-heating system 72, in order to be deposited at a desired controlled temperature before a deposit of the print material, molten or liquified on it by the print head 11.

In a variant, the three-dimensional printing device according to some embodiments, according to this embodiment, can include wire or ribbon supply systems which can be crossed by being superimposed at the advancement of the print head. This allows the wires or ribbons to be superimposed on the material already laid before the supply of another layer of material by the print head. The length, width and diameter of the wires or ribbons will vary according to connected characteristics chosen, thus allowing to optimize the cohesion with the material deposited.

In a variant, the wire or ribbon supply device includes heaters, which, following the laying of the wires or ribbons, generate a connection of the wire or ribbon to the preceding layer at the time of the contacting with the component 29. This allows to position the wire(s) or ribbon(s) before or after the passage of the three-dimensional print head.

The whole of the wire or ribbon supply system, as well as its cutting, can, in a variant, be produced under a controlled atmosphere. A material supplied by the print head can be a polymer, a composite or ferromagnetic material, the print head 11 having to be adapted according to the material.

Likewise, the winder 58, 59 can be put in a controlled atmosphere if needed, integrating a sealing of the whole of the system which is located behind the winder 58, 59 up to the supply of wire or ribbon to the wire or ribbon supply system 67, 68. It is to be specified, if needed, that the inert-gas spray nozzle 13 can generate a flow of gas at the level of its outlet 141 oriented towards the direction of travel of the print head 11. The inert-gas will therefore have a projection, making it emerge in front of the nozzle head.

The three-dimensional printing devices which have just been defined, can also be used in as many workstreams as possible, from the moment the component is started up at a fixed point. It can be assembled on an end of an arm of a multi-axe robot.

On the other hand, the component being produced can be made by the three-dimensional printing device according to some embodiments by using a support material made of silica for the parts stressed from the component being produced. The silica's breakable character allows an easy removal of the support once the printing of the component being produced has finished.

The three-dimensional printing device which has just been defined allows to produce components, made of a very large number of materials or combination of materials which could be melted or molten for simple or complex combination by inductors and/or by the passage of a current resistively. The print material(s) used is/are therefore ferromagnetic and/or magnetodielectric and/or composite polymers connected to ferromagnetic parts.

In a variant of the embodiment, the three-dimensional printing device according to some embodiments includes machining devices arranged so as to produced, once the laying of one or several layers of print material has been done, machining on all or most the desired axes in order to obtain the desired surfaces and dimensions, to carry out machining during the construction of a component being produced, whatever the advancement status of the component being produced, in order to rectify or to bring the parts of the component already produced to the required size and specifications requested, whatever the requested machining axis, to finalise the production of the component according to the existing imperfections or the specification requested and on all or most requested axes. Another solution proposed is machining following the finalisation of the component.

The principle of attaching the component being produced 29 on the printer can be done with several principles, a first solution is to attach the basic plate of the first layer of the component 29 by screwing to the printer. A second solution is to use bolts attached to the printer support in order to create the supplementary production 29 from the attachment point(s). A third solution is to hold a construction plate allowing the laying of the first supplementary printing layer, the holding can be done by any device for allowing to hold a fixed position, by tightening around the construction plate, for example, by using screws and/or tightening bolts.

In another variant of the embodiment, the three-dimensional printing device according to some embodiments includes a system for pre-heating or controlling the temperature of a part already produced of the component being produced and in particular including a plate supporting the component being produced, of which the temperature is thus controlled by a cooling system or an increase in liquid temperature or by induction or by heat radiation provided in the plate. Moreover, the plate can have several positioning axes or movement axes, in order to increase production solutions or production steps.

The three-dimensional printing device according to some embodiments includes systems for cooling different elements, as this has been defined previously, to allow the control of the temperature of the different bodies of the printing device, allowing, if needed, to obtain a desired positive or negative temperature of these bodies.

In a variant of the embodiment, the three-dimensional printing device according to some embodiments includes a device for gathering information, like form measurements, allowing current printing adjustments by the control and drive device 4, such as a modification of the configurations of the path and position of the print material.

It must or should be noted, that the three-dimensional printing device according to some embodiments can be produced by using rotating induction systems, gas, wire or ribbon supply systems, and therefore includes systems rotating around the deposit zone 40 and therefore the wire descent tube or around the powder projection nozzle.

The three-dimensional printing device according to some embodiments can be assembled in its entirety or only certain parts on an arm or a multi-axe unit. Because of this, three-dimensional printing devices according to some embodiments can be interchanged during the production of the component being produced.

It is possible to assemble, with a three-dimensional printing device according to some embodiments, two or more existing components before being connected or welded together. Furthermore, the three-dimensional printing device according to some embodiments can bring a printing supplement to the components thus assembled. The printing supplement can be determined, following the assembly of the components, using a three-dimensional scanner system. Once the assembly of the components is carried out, the three-dimensional printing device according to some embodiments undergoes a three-dimensional reproduction of the assembly, using the three-dimensional scanner system, then it compares the reproduction thus produced with a model of the final aspect to be obtained, in order to determine the printing supplement to bring to the assembly of the components. In a variant, if the three-dimensional printing device according to some embodiments includes machining devices, it is then possible to rectify, if need be, the assembly of the components produced, following a comparison between the three-dimensional reproduction with the model of the final aspect.

Of course, it is possible to bring numerous modifications to some embodiments, without moving away from its framework.

The invention claimed is:

1. A device for the three-dimensional printing of a component that is to be produced, the component to be produced including a receiving surface, the device comprising:
    a print head that includes:
    a supplier for supplying a ferromagnetic print material, the supplier including an outlet; and
    a device for allowing the melting of the print material prior to laying, the device for allowing the melting including a first heater that heats by induction of the print material;
    a first inert-gas spray nozzle disposed at the level of the outlet of the supplier; and
    a second inert-gas spray nozzle disposed at the level of a point of contact of the molten print material with the receiving surface of the component that is to be produced in the process of being produced so as to allow gas to be supplied at a desired pressure.

2. The device according to claim 1, wherein the first heater is arranged so as to allow a heating up of a deposit surface of the molten print material of the component being produced.

3. The device according to claim 1, wherein the device for allowing the melting includes a second heater that heats by induction of a deposit surface of the molten print material of the component being produced.

4. The device according to claim 1, wherein the first and/or second heaters surrounds an outlet of the print material supplier.

5. The device according to claim 1, wherein the first and/or second heaters only extends in front of an outlet of the print material supplier and has a U-shape at 90° from a direction of travel of the print head in use.

6. The device according to claim 1, wherein the first and/or second heaters has a horseshoe shape, being positioned in front of and in the part around an outlet of the print material supplier.

7. The device according to claim 5, wherein the first and/or second heaters are positioned in front of and/or behind and/or on the sides of the print material supplier.

8. The device according to claim 1, wherein the first and/or second heaters are arranged so as to allow a deposit of the print material under any angle of incidence.

9. The device according to claim 1, wherein the device for allowing melting includes a current supplier, of which a terminal is connected to the print material and another terminal is connected to the component being produced.

10. The device according to claim 1, wherein the print material supplier includes one or several print material supply ducts.

11. The printing device according to claim 1, further comprising two or more print heads.

12. The device according to claim 1, wherein the print material is in the form of a powder.

13. The device according to claim 12, wherein the print material supplier includes a powder projection nozzle.

14. The device according to claim 12, wherein the powder forming the print material is propelled by an inert-gas.

15. The device according to claim 1, wherein the print material is in the form of a wire.

16. The device according to claim 1, wherein the print material is in the form of a wire, and the supplier of the print head is configured to supply a ferromagnetic and/or magnetodielectric material as the print material.

17. The device according to claim 1, wherein the print head includes a supplier for supplying a reinforcement material in the form of a wire or a ribbon arranged so as to lay the reinforcement material on a deposit surface of the molten print material of the component being produced, before a deposit point of the molten print material of the deposit surface.

18. The device according to claim 1, wherein the material supplier and/or the supplier for supplying a reinforcement material includes a device for putting in-use materials under inert-gas.

19. The device according to claim 1, further comprising an inert-gas spray adjustment device.

20. The device according to claim 1, further comprising a cooler for cooling all or part of the print head.

21. The device according to claim 1, wherein the device for allowing the melting of the print material, the first inert-gas spray nozzle and the second inert-gas spray nozzle are assembled so that they can be moved in relation to the print material supplier.

22. The device according to claim 1, further comprising at least one inductor connected to one or several induction devices positioned either in front of, behind, or on the sides of the print head.

23. A method of three-dimensional printing, comprising:
    operating the device according to claim 1 to assemble two or more existing components by a deposit of print material at a connection between the two or more components.

* * * * *